UNITED STATES PATENT OFFICE.

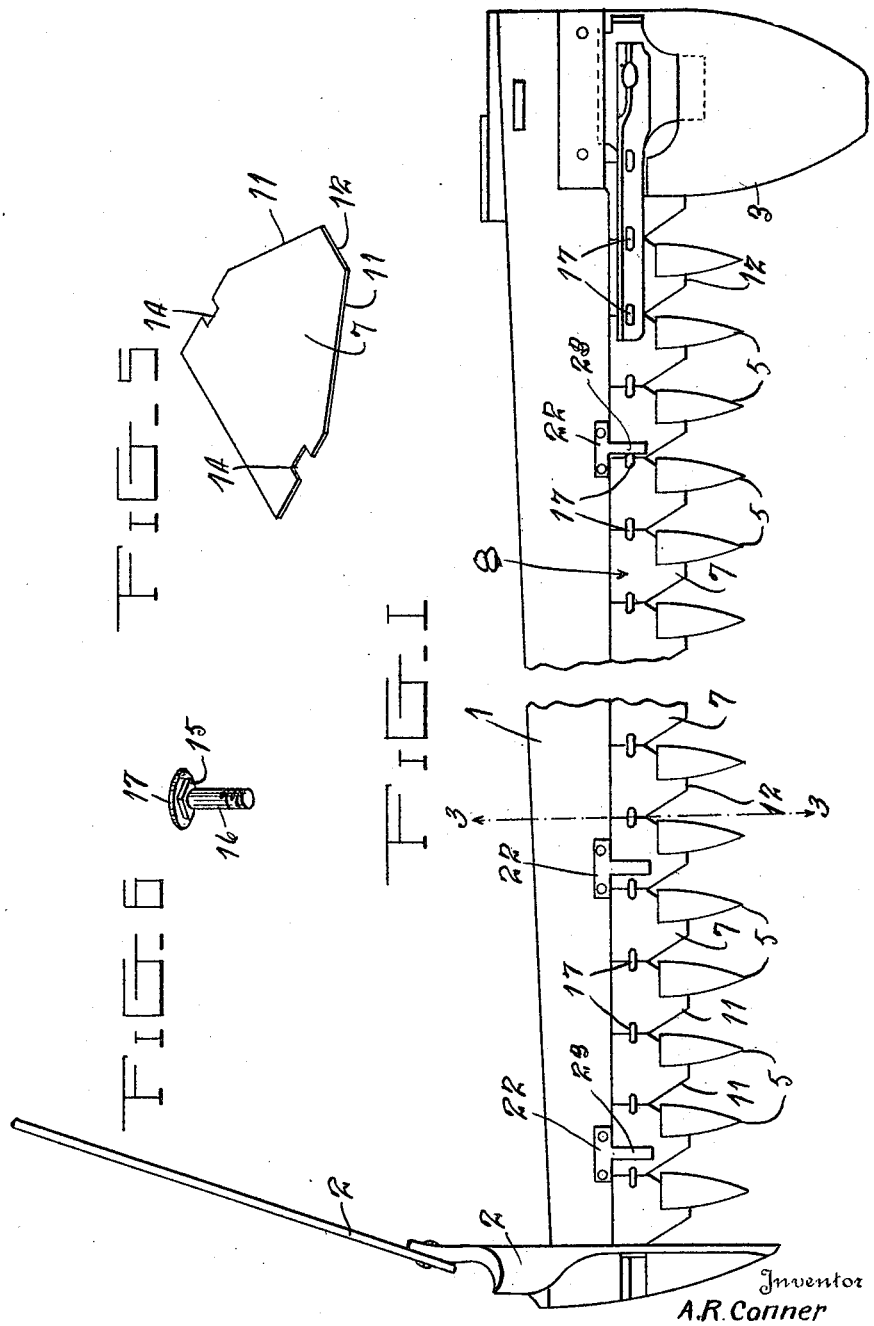

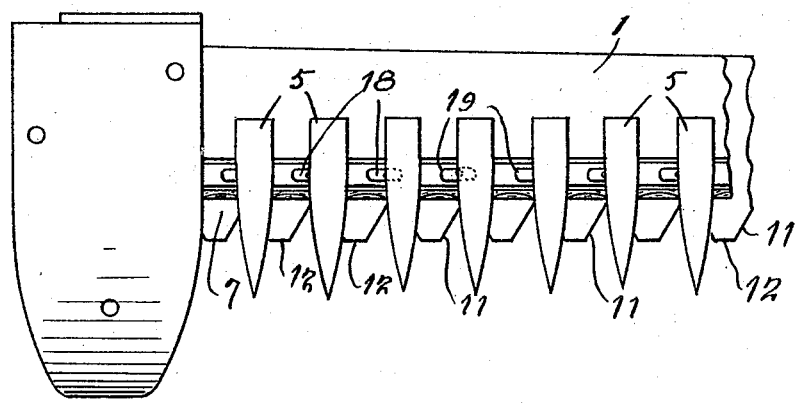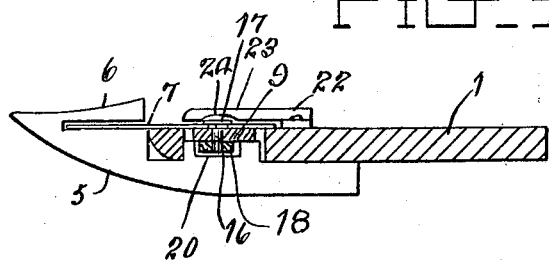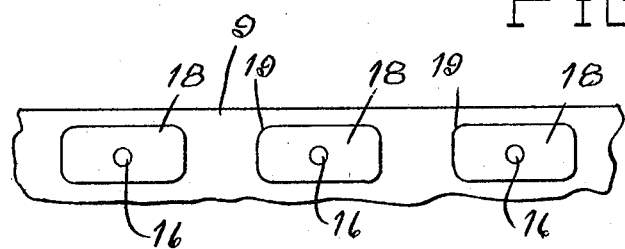

AMBER R. CONNER, OF MEREDITH CENTER, NEW HAMPSHIRE.

CUTTER-BAR CONSTRUCTION.

1,134,588.      Specification of Letters Patent.      Patented Apr. 6, 1915.

Application filed April 23, 1914. Serial No. 833,954.

*To all whom it may concern:*

Be it known that I, AMBER R. CONNER, a citizen of the United States, residing at Meredith Center, in the county of Belknap and State of New Hampshire, have invented certain new and useful Improvements in Cutter-Bar Construction, of which the following is a specification.

This invention relates to harvesters which employ reciprocatory cutter bars which are composed of a plurality of cutting sections for cutting the grain or hay; and the primary object of the invention is the provision of a cutter bar of this nature which has the cutting sections detachably attached thereto so that a section may be easily and quickly removed from the bar when it becomes broken, without necessitating the aid of tools other than are commonly carried upon harvesting machines. In cutter bars of this type now in use, the cutting sections are riveted to the bar so that when one of them becomes broken or it is desired to interchange the cutting section, it is necessary to take the cutter bar to a blacksmith shop or to employ special tools for cutting the rivets for removing the sections.

It is the object of this invention to provide cutting sections which have rectangularly shaped openings formed in their marginal side edges for the reception of the square portion of bolts, so as to prevent the turning of the bolts, and to employ nuts of novel construction for binding the cutting sections upon a cutter bar, which nuts are acted upon by the cutter bar guard construction for preventing the loosening rotation of the nuts during the reciprocating movement of the cutter bar.

With the foregoing and other objects in view, this invention consists of such novel features of construction, combination and arrangement of parts as will be hereinafter more fully described, illustrated in the accompanying drawings and claimed.

In describing the invention in detail, reference will be had to the accompanying drawings, wherein like characters designate like or corresponding parts throughout the several views, and in which, Figure 1 is a top plan view of a cutter bar constructed in accordance with this invention, Fig. 2 is a fragmentary bottom plan view of a cutter bar, Fig. 3 is a cross-sectional view on the line 3—3 of Fig. 1, Fig. 4 is a bottom plan of a fragment of the cutter bar construction, showing the novel form of nut, Fig. 5 is a perspective view of a cutting section, and Fig. 6 is a perspective view of the bolt used for attaching the cutting sections to the bar.

Referring more particularly to the drawings, 1 designates the supporting bar of the cutter bar construction, which bar has the ordinary type of divider board 2 connected to its outer terminal end and the protective traction shoe 3 formed upon its inner end which is attached to the machine in any suitable manner (not shown). The supporting bar 1 has secured to its under surface a plurality of pointed guards 5, which guards are of similar construction commonly employed in the construction of cutter bars of this nature, having the guideway 6 formed in their outer protruding pointed ends, in which guideways are seated the sections 7 of the cutter bar 8.

The cutter bar 8 is constructed of a bar 9 which extends the entire length of the supporting bar 1, and which has secured to its upper surface a plurality of cutting sections 7. The cutting sections 7 are provided with rectangularly shaped cut-out portions 14 formed in their opposite side edges, so that when the sections are positioned upon the bar 9 the rectangularly shaped cut-out portions 14 will aline with the cut-out portions in the section next thereto forming a rectangular opening for the reception of rectangular portions 15 formed on the bolts 16. The bolts 16 have flat elongated heads 17 formed upon their upper terminal ends, which heads abut the upper faces of the cutting sections 7, when the rectangular sections 15 are seated in the rectangularly shaped cut-out portions 14 for binding the cutting sections to the bar 9. The rectangular sections 15 are formed upon the bolt 16 adjacent to the inner side of their oval shaped head 17 as is clearly shown in Fig. 6 of the drawing. The terminal ends of the bolts 16 are provided with screw threads, upon which are mounted nuts 18. The nuts 18 are of peculiar construction, being oblong in shape and having their corners rounded, as is clearly shown at 19 in Fig. 4 of the drawing.

The guard members 5 are provided with recesses 20, which recesses are milled or formed within the guard members adjacent the portion of the latter which receives the bar 9, and the recesses 20 are of such size as to permit of the passage of the nuts 18 therethrough, during the reciprocatory movement of the cutter bar 8, when the nuts are positioned so that their narrowest dimension or width is parallel with the longitudinal line of the bar 9. In instances where the nuts 18 work loose upon the bolts 16, the rounded edges of the nuts will engage the walls of the recesses 20, which will cause the nuts to move into their proper position, and prevent the loosening of the cutting sections 7 upon the bar 9.

The supporting bar 1 has brackets 22 formed thereupon, which brackets have arms 23 extending outwardly over the cutter bar for steadying the reciprocating movement of the bar. The arms 23 are provided with recesses 24, so as to permit of the passage of the bolts head 17 therethrough during the reciprocating movement of the cutter bar.

From the foregoing description taken in connection with the accompanying drawings, the advantages of the construction and of the method of operation of the improved cutter bar will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a cutter bar construction, the combination, of a supporting bar, having a plurality of guards secured thereto, a bar slidably carried by said supporting bar, a plurality of cutting sections detachably attached to said slidable bar by bolts, nuts mounted upon the ends of said bolts for binding said sections in engagement with said sliding bar, and means formed upon said guards for preventing the loosening rotation of said nuts upon said bolts.

2. In a cutter bar construction, a supporting bar having a plurality of guards secured thereto, a bar slidably carried by said supporting bar, a plurality of cutting sections having rectangularly shaped cut-out portions formed in their opposite side edges, bolts having rectangular portions formed upon their shanks for insertion into said rectangularly cut-out portions, for preventing the rotation of said bolts, oblong nuts mounted upon the ends of said bolts for binding said sections in engagement with said sliding bar, and means formed upon said guards for preventing the loosening rotation of said nuts upon said bolts.

3. In a cutter bar construction, a supporting bar having a plurality of guards secured thereto, a bar slidably carried by said supporting bar, a plurality of cutting sections having rectangularly shaped cut-out portions formed in their opposite side edges, bolts having rectangular portions formed upon their shanks for insertion into said cut-out portions, for preventing the rotation of said bolts, oblong nuts mounted upon the ends of said bolts for binding said sections in engagement with said sliding bar, said guards being provided with recesses in which said nuts are slidable, said nuts having their corners rounded for engagement with the walls of said recesses for preventing the loosening rotation of said nuts.

In testimony whereof I affix my signature in presence of two witnesses.

AMBER R. CONNER.

Witnesses:
E. C. DAVIS,
A. R. DERMODY.

Copies of this patent may be obtained for five cents each, by addressing the "Commissioner of Patents, Washington, D. C."